(12) United States Patent
Babini et al.

(10) Patent No.: US 7,059,100 B2
(45) Date of Patent: Jun. 13, 2006

(54) INDUCTION SEALING DEVICE FOR HEAT SEALING PACKAGING MATERIAL

(75) Inventors: Andrea Babini, Modena (IT); Gianni Fangarezzi, Carpi (IT)

(73) Assignee: Tetra Laval Holdings & Finance SA, Pully (CH)

( * ) Notice: Subject to any disclaimer, the term of this patent is extended or adjusted under 35 U.S.C. 154(b) by 0 days.

(21) Appl. No.: 10/480,475

(22) PCT Filed: Jun. 17, 2002

(86) PCT No.: PCT/EP02/06659

§ 371 (c)(1),
(2), (4) Date: Dec. 12, 2003

(87) PCT Pub. No.: WO02/102574

PCT Pub. Date: Dec. 27, 2002

(65) Prior Publication Data

US 2004/0182046 A1    Sep. 23, 2004

(30) Foreign Application Priority Data

Jun. 18, 2001  (EP) ................................. 01830402

(51) Int. Cl.
*B65B 7/02*    (2006.01)
(52) U.S. Cl. .................... 53/376.2; 53/548; 53/552; 53/563; 156/272; 156/379
(58) Field of Classification Search .................. 53/548, 53/552, 563, 376.2; 156/272, 379; 219/633, 219/656, 672, 676
See application file for complete search history.

(56) References Cited

U.S. PATENT DOCUMENTS

| 3,864,186 | A | * | 2/1975 | Balla ........................ 156/272.2 |
| 4,704,509 | A | * | 11/1987 | Hilmersson et al. ........ 219/633 |
| 5,649,407 | A | * | 7/1997 | Blomqvist .................. 53/374.8 |
| 5,678,392 | A | * | 10/1997 | Konno ......................... 53/477 |
| 5,787,690 | A | * | 8/1998 | Konno ......................... 53/550 |
| 5,889,263 | A | * | 3/1999 | Andersson .................. 219/633 |
| 6,167,681 | B1 | * | 1/2001 | Yano et al. ................... 53/477 |
| 6,216,420 | B1 | * | 4/2001 | Mazzetto et al. ........... 53/373.7 |
| 6,260,336 | B1 | * | 7/2001 | Motomura .................... 53/551 |
| 6,725,634 | B1 | * | 4/2004 | Palmqvist et al. ............ 53/548 |

FOREIGN PATENT DOCUMENTS

| EP | 0 642 914 | 3/1995 |
| EP | 0 950 608 | 10/1999 |
| EP | 0 992 431 | 4/2000 |

* cited by examiner

*Primary Examiner*—John Sipos
*Assistant Examiner*—Hemant M. Desai
(74) *Attorney, Agent, or Firm*—Buchanan Ingersoll PC

(57) ABSTRACT

There is described an induction sealing device for heat sealing packaging material for producing sealed packages of pourable food product and fed in a first direction. The sealing device has induction means interacting with the packaging material by means of a pair of first active surfaces and a pair of second active surfaces interposed between the first active surfaces in the first direction; and the second active surfaces have, in the first direction, a width greater than the width of the first active surfaces at least along most of the length of the first and second active surfaces in a second direction perpendicular to the first direction.

19 Claims, 3 Drawing Sheets

INDUCTION SEALING DEVICE FOR HEAT SEALING PACKAGING MATERIAL

This is a U.S. National Stage of International application No. PCT/EP02/06659, filed on Jun. 17, 2002.

TECHNICAL FIELD

The present invention relates to an induction sealing device for heat sealing packaging material for producing sealed packages of pourable food products.

The present invention also relates to a packaging unit for continuously producing sealed packages of a pourable food product and featuring said sealing device.

BACKGROUND ART

Many pourable food products, such as fruit juice, UHT milk, wine, tomato sauce, etc., are sold in packages made of sterilized packaging material.

A typical example of such a package is the parallelepiped-shaped package for liquid or pourable food products known as Tetra Brik Aseptic (registered trademark), which is formed by folding and sealing laminated strip packaging material having a multilayer structure comprising a layer of fibrous material, e.g. paper, covered on both sides with layers of heat-seal plastic material, e.g. polyethylene.

In the case of aseptic packages of long-storage products such as UHT milk, the packaging material has a layer of barrier material, e.g. an aluminium sheet, which is superimposed on a layer of heat-seal plastic material and is in turn covered with another layer of heat-seal plastic material eventually defining the inner face of the package contacting the food product.

As is known, such packages are made on fully automatic packaging units, on which a continuous tube is formed from the web-fed packaging material; the web of packaging material is sterilized on the packaging unit itself, e.g. by applying a chemical sterilizing agent, such as a hydrogen peroxide solution, which, after sterilization, is removed, e.g. vaporized by heating, from the surfaces of the packaging material; and the web of packaging material so sterilized is maintained in a closed sterile environment, and is folded and sealed longitudinally to form a vertical tube.

The tube is fed continuously in a first vertical direction, is filled with the sterilized or sterile-processed food product, and is gripped at equally spaced cross sections by two pairs of jaws. More specifically, the pairs of jaws act cyclically and successively on the tube to heat seal the packaging material of the tube and form a continuous strip of pillow packs connected to one another by respective transverse sealing bands, i.e. extending in a second direction perpendicular to said first direction.

The pillow packs are separated by cutting the relative transverse sealing bands, and are then conveyed to a final folding station where they are folded mechanically into the finished parallelepiped shape.

The portion of the tube gripped between each pair of jaws is heat sealed by heating means carried on one of the jaws and for locally melting the two layers of heat-seal plastic material gripped firmly between the jaws.

More specifically, when the layer of barrier material is defined by a sheet of electrically conductive material, e.g. aluminium, the packaging material is normally sealed using a so-called induction heat-seal process, in which, when the tube is gripped by the jaws, eddy current is induced in the aluminium sheet to heat the aluminium sheet locally and so locally melt the heat-seal plastic material.

More specifically, in induction heat sealing, the heating means substantially comprise an inductor, which is carried by one of the two jaws, known as the sealing jaw, is supplied by a high-frequency current generator, and is substantially defined by one or more induction bars made of electrically conductive material, extending parallel to the second direction, and interacting with the tube material to induce eddy current in and heat the material to the required sealing temperature. The other jaw, known as a counterjaw, has pressure pads of elastomeric material, which cooperate with the induction bars to heat seal the tube along a respective transverse sealing band.

At the end of the sealing operation, a cutting member, carried by one of the two jaws, normally the counterjaw, and interacting with the tube of packaging material, is activated to cut the tube along the centerline of the transverse sealing band and so cut a pillow pack off the bottom end of the tube of packaging material. The bottom end is therefore sealed transversely, and the jaws, on reaching the bottom dead center position, are opened to avoid interfering with the top portion of the tube. At the same time, the other pair of jaws, operated in the same way, moves down from the top dead center position and repeats the gripping/forming, sealing and cutting operations described above.

From analysis of the packaging material during the heat-seal operation, the eddy current induced in the cross section of the tube of packaging material gripped between a respective pair of jaws has been found to travel along an endless path, which is linear on the two longitudinal sides of the inductor-tube interaction portion, i.e. along the sides parallel to the second direction, and is roughly semicircular close to the edges of the cross section. In other words, the current travels linearly in opposite directions along the two longitudinal sides of the inductor-tube interaction portion, and, close to the edges of the cross section gripped between the jaws, deflects towards the center of the cross section ("bending-off effect"), so that the transverse sealing band is narrower at the ends than at the center portion, i.e. the portion intersecting the longitudinal seal initially formed to produce the tube of packaging material. Moreover, when packaging pourable food products containing small solid particles (such as seeds in tomato products) which may get trapped between the unsealed portions of the two contacting sheets of the packaging material, as wide a transverse sealing band as possible is desirable to reduce the likelihood of channeling through the sealed portion.

To eliminate the above drawbacks, Patent Application EP0992431, filed by the present Applicant, proposes that each cross section of the tube of packaging material be cut before being sealed.

As described in the above European patent, inverting the cutting and sealing operations produces a variation in the path of the eddy currents induced in the cross sections of the tube of packaging material. That is, the parting line produced by the cutting member in the tube of packaging material interrupts the electric continuity of the aluminium sheet, so that the eddy currents induced by the induction bars in the packaging material are confined to opposite sides of the parting line. In other words, the eddy current induced in the packaging material by the induction bars on one side of the parting line tends towards the induction bars on the opposite side of the parting line, but, owing to the interruption in the packaging material, is forced to complete a closed path on the same side of the parting line.

The sealing area on both sides of the parting line is therefore more or less constant, by drastically reducing the bending-off effect of the eddy current close to the edges of the cross section of the tube gripped between the jaws.

Number 50 in FIG. 6 indicates as a whole one example of a known sealing jaw which may be used in particular on packaging units in which the cross sections of the tube of packaging material are cut before being induction sealed.

Jaw 50 has a plane M of symmetry perpendicular to the traveling direction of the tube of packaging material, and comprises two induction elements 51, 52 housed inside respective face seats on jaw 50 and interacting with the packaging material via respective pairs of active surfaces 53, 54.

More specifically, induction element 51 is U-shaped, has a substantially annular cross section, and externally defines the two active surfaces 53, which are located symmetrically on opposite sides of plane M. Induction element 52 is defined by a straight bar having a U-shaped cross section, housed along the middle of jaw 50, and defining the two active surfaces 54, which are located on opposite sides of plane M and between active surfaces 53.

Active surfaces 53, 54 all have continuous or segmented longitudinal projections projecting towards the packaging material.

When using sealing jaw 50, the eddy current induced in the packaging material has been found to travel along endless, substantially symmetrical paths on opposite sides of the parting line produced by the cutting member. More specifically, on each side of the parting line, the eddy current travels linearly along each active surface, and deflects minimally close to the edges of the packaging material; which deflection only affects a small part of the sealing portion and is therefore negligible.

While providing for wider transverse sealing bands than those obtainable without inverting the cutting and sealing operations, sealing jaw 50 described above has several minor drawbacks preventing its many advantages from being used to the full.

In particular, FIG. 7 shows a graph of the power induced (continuous line) and the temperature (dash line) in the aluminium layer of the cross section of the tube of packaging material interacting with jaw 50 as a function of the distance from plane M or, equally, from the parting line of the cross section.

The FIG. 7 graph refers to only one of the two halves into which the cross section of the tube of packaging material interacting with jaw 50 is ideally divided by plane M, it being understood that the induced power and temperature curves in the other half of the cross section are perfectly symmetrical with those shown with respect to plane M.

As shown in the FIG. 7 graph, given the geometry of sealing jaw 50, and in particular of active surfaces 53, 54 of induction elements 51, 52, the power induced in the aluminium layer reaches a peak P1* at plane M and a peak P2* at each active surface 53, and assumes a minimum value between each active surface 54 and the adjacent active surface 53. More specifically, peak P2* is much lower than peak P1*.

Temperature distribution along the aluminium layer of the packaging material is a direct result of the induced power distribution produced by the dimensional ratios of active surfaces 53, 54 of induction elements 51, 52.

More specifically, moving in the traveling direction of the packaging material away from plane M or, equally, from the parting line produced in the cross section by the cutting member, the temperature in the aluminium layer of the cross section of the tube of packaging material interacting with jaw 50 falls sharply (by about 40%).

The above temperature distribution results in overheating of the layers of heat-seal plastic material at the mid longitudinal portion of the transverse sealing band, so that the molten material gripped between the jaws tends to flow outwards of the sealing band, thus impairing the quality of the seal.

To make up for the low power induced in the eddy current deflection regions, which results in reduced heating of the packaging material, as deducible from FIGS. 6 and 7 combined, sealing jaw 50 must be equipped, at the current deflecting regions, with inserts made of magnetic-flux-concentrating material, such as ferrite-containing composite material; and similar inserts must be provided on jaw 50 at the intersection between the transverse sealing band and the longitudinal seal on the tube of packaging material. In fact, at said intersection, where the packaging material for sealing is thicker owing to the presence of three superimposed portions of material, the sealing quality obtainable, without the inserts, in the lesser heated portion of the packaging material is far from satisfactory.

DISCLOSURE OF THE INVENTION

It is an object of the present invention to provide an induction sealing device designed to eliminate the aforementioned drawback.

According to the present invention, there is provided an induction sealing device for heat sealing a packaging material for producing sealed packages of pourable food products.

It is a further object of the present invention to provide a packaging unit for producing sealed packages of a pourable food product from a tube of packaging material, and which provides for improved transverse sealing of the packaging material as compared with known packaging units.

According to the present invention, there is provided a packaging unit for producing sealed packages of a pourable food product from a tube of packaging material.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
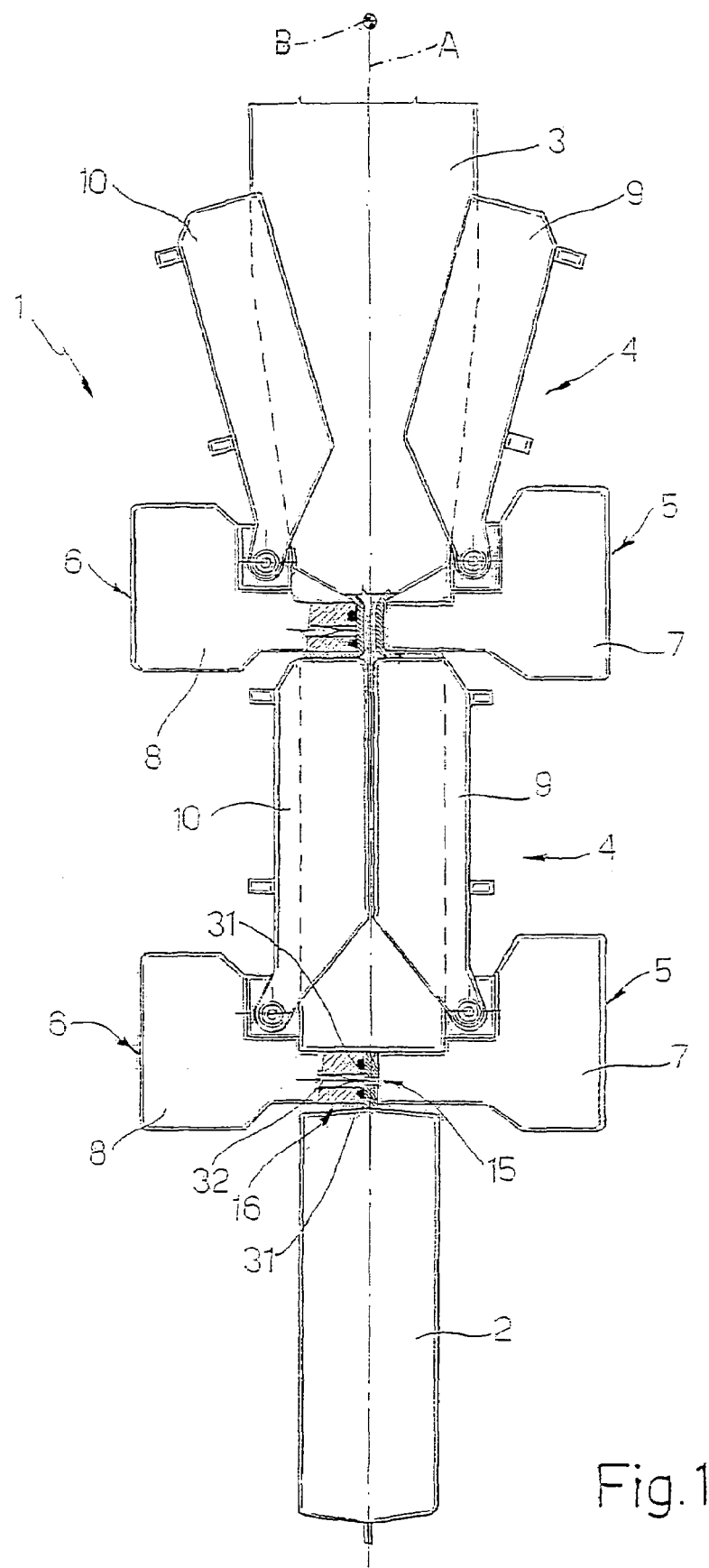
FIG. 1 shows a side view, with parts removed for clarity, of a packaging unit for producing aseptic sealed packages of pourable food products from a tube of packaging material fed along a vertical forming path.

Number 1 in FIG. 1 indicates as a whole a packaging unit for producing aseptic sealed packages 2 of a pourable food product, such as pasteurized or UHT milk, fruit juice, wine, etc., from a tube 3 of packaging material.

The packaging material has a multilayer structure (not shown) and comprises a layer of fibrous material, normally paper, covered on both sides with respective layers of heat-seal plastic material, e.g. polyethylene; and the side of the packaging material eventually contacting the food product in package 2 also has a layer of electrically conductive barrier material, e.g. aluminium, in turn covered with one or more layers of heat-seal plastic material.

Tube 3 is formed in known manner upstream from unit 1 by longitudinally folding and sealing a web of heat-seal sheet material, is filled with the sterilized or sterile-processed food product for packaging, and is fed by known devices (not shown) along a vertical path defined by a direction A.

Unit 1 comprises a pair of forming assemblies 4 movable vertically along respective guides (not shown) and which interact cyclically and successively with tube 3 to grip, induction heat seal, and cut tube 3 at equally spaced cross sections.

Each forming assembly 4 substantially comprises a slide (not shown) running along the respective guide; and two jaws 5, 6 (shown only as required for a clear understanding of the present invention) hinged to the slide about respective horizontal axes and movable between a closed position and a fully-open position.

In the example shown, jaws 5, 6 of each forming assembly 4 have respective arms 7, 8, which interact with tube 3, extend parallel to a direction B perpendicular to direction A, and are located on opposite sides of tube 3.

Each forming assembly 4 also comprises two forming tabs 9, 10 facing each other, hinged to respective jaws 5, 6, and movable between an open position, into which they are pushed by elastic means (not shown), and a closed position in which they mate to define a gap defining the shape and volume of the package 2 to be formed between them.

Each forming assembly 4 also comprises an induction sealing device 15 and a cutting device 16 for respectively induction heat sealing and cutting along the mid-line of each cross section of tube 3 of packaging material gripped between the relative jaws 5, 6.

Figure 3:
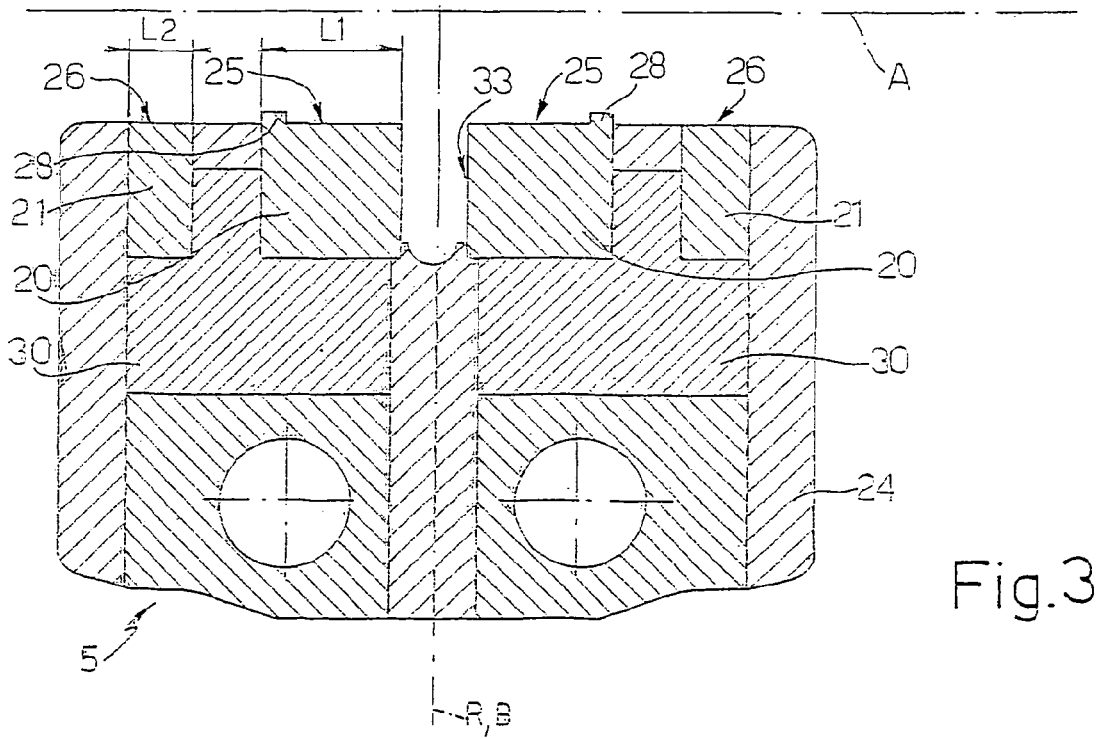
FIG. 3 shows a cross section of an induction sealing jaw in accordance with the present invention and forming part of the FIG. 1 packaging unit.

With particular reference to FIG. 3, sealing device 15 comprises two pairs of induction elements 20, 21 housed in respective face seats in a supporting body 24 connected integrally by conventional fastening means to arm 7 of jaw-5 of the relative forming assembly 4. Alternatively, supporting body 24 may be formed integrally with arm 7 of relative jaw 5.

Figure 5:
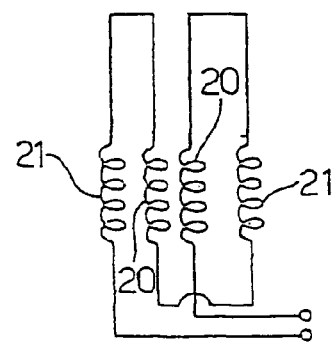
FIG. 5 shows an equivalent electric diagram of the FIG. 3 sealing jaw.

Induction elements 20, 21 are preferably connected in series (FIG. 5) and are supplied by a known current source not shown. Alternatively, induction elements 20, 21 may be connected in parallel, though this solution is not as efficient as a series connection and fails to provide for optimum stability of sealing device 15 when induction elements 20, 21 are a small distance apart.

In the example shown, induction elements 20, 21 are defined by respective electrically conductive bars extending in direction B and arranged in pairs on opposite sides of a mid-plane R, perpendicular to direction A, of supporting body 24 of relative jaw 5.

More specifically, induction elements 20 are symmetrical with respect to plane R and interposed between induction elements 21, which are also arranged symmetrically on opposite sides of plane R.

Preferably, induction elements 20 have a square cross section, and induction elements 21 a rectangular cross section.

Induction elements 20, 21 interact with tube 3 of packaging material by means of respective preferably rectangular active surfaces 25, 26, which are elongated in direction B, extend in the same plane perpendicular to plane R, and have a width in direction A and a length in direction B. Active surfaces 25, which are identical, are obviously interposed, in direction A, between active surfaces 26, which are also identical and of the same length as active surfaces 25.

As shown in FIG. 3, respective projections 28, elongated in direction B, project from active surfaces 25 towards tube 3 of packaging material. Projections 28 may be continuous or segmented, extend along substantially the whole length of respective active surfaces 25, and provide, when heat sealing, for increasing the gripping pressure on tube 3.

In a variation not shown, active surfaces 26 may also be provided with respective continuous or segmented longitudinal projections.

An important aspect of the present invention is that the width L1 of active surfaces 25 is greater than or equal to the width L2 of active surfaces 26, at least along most, preferably 80%, of the length of active surfaces 25, 26.

The ratio of width L1 of active surfaces 25 to width L2 of active surfaces 26 advantageously, ranges between 1 and 4, and is preferably 2.25.

Figure 4:
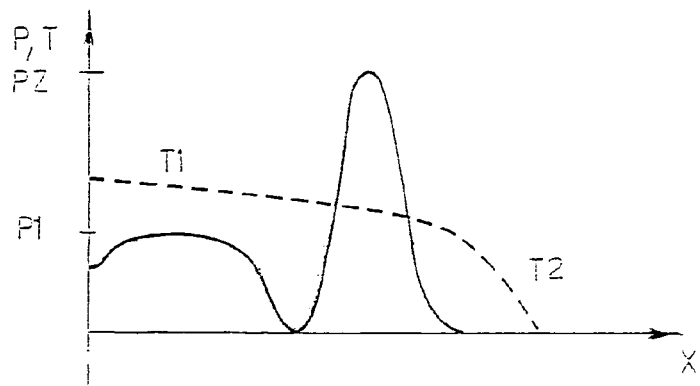
FIG. 4 shows a graph of the power induced and the temperature in the aluminium layer of the packaging material interacting with the FIG. 3 sealing jaw as a function of the distance from a mid-plane of the jaw perpendicular to the forming path.

The FIG. 4 graph shows the power induced (continuous line) and the temperature (dash line) in the aluminium layer of the cross section of tube 3 gripped between a relative pair of jaws 5, 6 as a function of the distance from mid-plane R of jaw 5 or, equally, from the mid cutting line of the cross section.

The FIG. 4 graph refers to only one of the two halves into which the cross section of tube 3 gripped between jaws 5 and 6 is ideally divided by plane R, it being understood that the induced power and temperature curves in the other half of the cross section are perfectly symmetrical with those shown with respect to plane R.

As shown in the FIG. 4 graph, the power induced in the aluminium layer reaches a peak P1 at active surfaces 25 and a peak P2 at active surfaces 26, and assumes a minimum value between each active surface 25 and the adjacent active surface 26. More specifically, peak P2 at induction elements 21 is much higher than peak P1.

The temperature graph is a direct result of the induced power distribution resulting from the dimensional ratios of active surfaces 25, 26 of induction elements 20, 21.

As shown clearly in FIG. 4, moving away from plane R in direction A, the temperature in the aluminium layer of the cross section of tube 3 gripped between jaws 5 and 6 falls slightly up to the outer periphery of jaw 5 (linear portion T1), and then sharply (knee portion T2) beyond jaw 5 where the packaging material does not need heat sealing. More specifically, along linear portion T1, the temperature falls by about 15–20%, so that heat is distributed more or less uniformly along the whole cross section of tube 3 being sealed.

In a preferred embodiment, supporting body 24 is made of aluminium-based material, and is fitted inside with two inserts 30 made of magnetic-flux-concentrating material—in the example shown, a ferrite-containing composite material—and interposed between induction elements 20, 21 and respective portions of supporting body 24.

Sealing device 15 also comprises two pressure pads 31 (FIG. 1) made of heat-resistant elastomeric material, preferably nitrile rubber, and housed in respective face cavities of matching shape formed in jaw 6 of each forming assembly 4 and located symmetrically on opposite sides of midplane R. Pressure pads 31 of each jaw 6 cooperate with active surfaces 25, 26 of induction elements 20, 21 of respective jaw 5 to grip and heat seal tube 3 on opposite sides of plane R.

Figure 2:
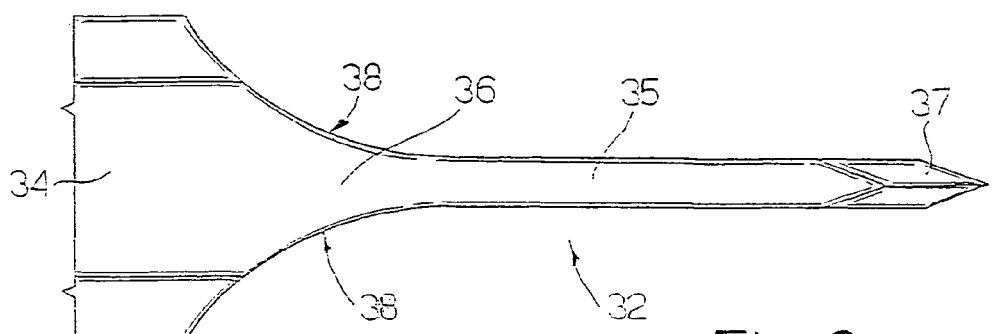
FIG. 2 shows a larger-scale side view of a cutting member of the FIG. 1 packaging unit.

With reference to FIGS. 1 and 2, cutting device 16 comprises a substantially flat cutting member 32, which is housed in sliding manner in a face seat on jaw 6 of each forming assembly 4, is movable along plane. R, and is activated in known manner (not shown) by a hydraulic cylinder incorporated in jaw 6.

Cutting member 32 is normally maintained, by known elastic means (not shown), in a withdrawn rest position housed completely inside respective jaw 6, and is moved by the respective hydraulic cylinder into a forward cutting position in which it projects frontwards from respective jaw 6, engages a cavity 33 in respective jaw 5, and cuts along the mid-line of the relative cross section of tube 3.

Cutting member 32 comprises a platelike base portion 34 integral with the output member of the hydraulic cylinder; and a cutter 35 thinner in direction A than base portion 34 to ensure high pressure during the cutting operation and prevent damaging the packaging material. More specifically, cutter 35 is connected to base portion 34 by a portion 36 increasing in section towards base portion 34 and defined by concave outer surfaces 38, and has a pointed end 37 at the opposite end.

Sealing device 15 as described above is especially suitable for packaging units in which the cross sections of tube 3 of packaging material are cut before being induction sealed.

Figure 7:
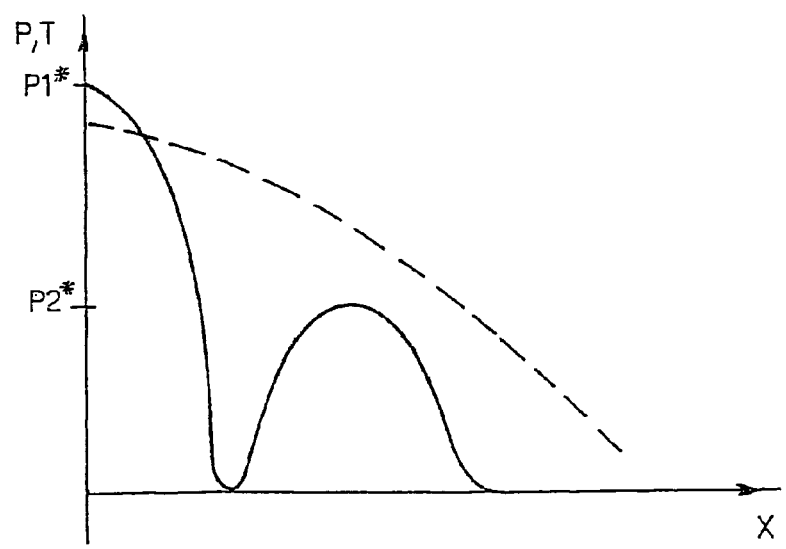
FIG. 7 shows a graph of the power induced and the temperature in the aluminium layer of the packaging material interacting with the FIG. 6 sealing jaw as a function of the distance from a mid-plane of the jaw perpendicular to the forming path.
Figure 6:
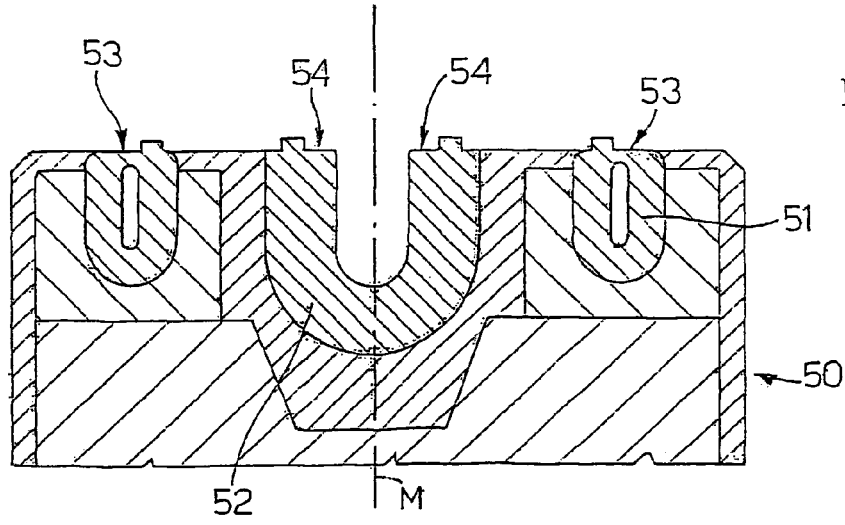
FIG. 6 shows a cross section of a known induction sealing jaw.

More specifically, as shown by a comparison of FIGS. 4 and 7, the new dimensional ratios adopted for active surfaces 25, 26 of induction elements 20, 21 provides for distributing heat more uniformly along the whole cross section of tube 3 gripped between jaws 5 and 6, and therefore improving sealing quality and, above all, eliminating the adverse effect of the molten heat-seal plastic material "extruding" from the sealing band due to local overheating.

Moreover, the change in induced power distribution along the cross sections of tube 3 for sealing, and in particular the increase in power induced at the outermost induction elements 21 of each jaw 5, eliminates the need for inserts of magnetic-flux-concentrating material in the eddy current bend-off regions and at the intersection between the transverse sealing bands and the longitudinal seal on tube 3 of packaging material. One sealing device 15 can therefore be used for different widths of tube 3 of packaging material, to produce different types of packages of the same volume.

Clearly, changes may be made to what is described and illustrated herein without, however, departing from the scope of the present invention as defined in the accompanying claims.

The invention claimed is:

1. An induction sealing device for heat sealing packaging material for producing sealed packages of pourable food products and fed in a first direction; said sealing device comprising induction means interacting with said packaging material by means of a pair of first active surfaces and a pair of second active surfaces interposed between said first active surfaces in said first direction: each said first and second active surface having a width in said first direction and a length in a second direction perpendicular to said first direction; the length of at least one of the second active surfaces being substantially equal to the length of at least one of the first active surfaces, the width of said second active surfaces being greater than the width of said first active surfaces at least along most of the length of the first and second active surfaces.

2. The device as claimed in claim 1, wherein the ratio between the width of said second active surfaces and the width of said first active surfaces ranges from 1 to 4.

3. The device as claimed in claim 2, wherein said ratio between the width of said second active surfaces and the width of said first active surfaces is 2.25.

4. The device as claimed in claim 1, wherein at least said second active surfaces have respective projections projecting towards said packaging material.

5. The device as claimed in claim 1 comprising a supporting body for housing said induction means, and which is made of an aluminum-based material and has, internally, a layer of magnetic-flux-concentrating material interposed between said induction means and the supporting body.

6. The device as claimed in claim 1, wherein said induction means comprising two pairs of electrically conductive portions respectively defining said first and second active surfaces and connected in series with each other.

7. The device as claimed in claim 1 wherein a tube of packaging material is fed in a first direction and filled continuously with said food product; said device including at least two pairs of jaws acting cyclically and successively on said tube to grip the tube at equally spaced cross sections; and wherein the induction sealing device is carried by each pair of said jaws for heat sealing the packaging material at said cross sections.

8. The device as claimed in claim 7, including cutting means carried by each pair of said jaws to cut said cross sections of said tube in a second direction perpendicular to said first direction; said cutting means comprising at least one cutting member having a base portion and a cutter extending from said base portion and thinner than the base portion in said first direction.

9. The device as claimed in claim 8, wherein said cutter is connected to said base portion by a portion increasing in section towards the base portion and defined by concave outer surfaces.

10. An induction sealing device for heat sealing a tube of packaging material and including a cutter element for severing individual packages as the tube advances in a first direction, the induction sealing device comprising: opposed jaws moveable toward each other to grip the tube of packaging material, a supporting body mounted on the jaws, a first pair of induction elements mounted on the supporting body and spaced apart from each other to form a groove for receiving the cutter element upon movement in a direction perpendicular to the first direction, a second pair of induction elements mounted on the supporting body and spaced from said groove a distance greater than the first pair of induction elements, the first and second pairs of induction elements forming a planar surface for engaging the packaging material to apply heat sufficient to seal the packing material, at least one of the induction elements of the first pair being spaced apart from both of the induction elements of the second pair, the width of the planar surface of the first pair of induction elements being greater than the width of the planar surface of the second pair of induction elements at least along most of the length of the induction elements.

11. The induction sealing device as claimed in claim 10 wherein the inductors extend parallel to each other and the ratio of the width of the planar surfaces of the first pair to the width of the planar surfaces of the second pair is in the range of between 1 and 4.

12. The sealing device as claimed in claim 10 wherein the width of the planar surface of the first pair of induction elements is greater than the width of the planar surface of the second pair of induction elements along at least 80% of the length of the inductors.

13. A sealing device for heat sealing packaging material comprising: a first pair of inductors extending parallel to each other and spaced apart a predetermined distance from each other, a second pair of inductors, the inductors of each pair extending parallel to each other and the inductors of the first pair being parallel to the inductors of the second pair, the inductors having an active surface aligned in a common plane, the first pair of inductors being interposed between the inductors of the second pair, the active surface of each of the inductors of the first pair and the second pair extending in a lengthwise direction, the active surface of each of the inductors of the second pair having end portions extending at least 25% of the length of the second pair of inductors and a middle portion located between the end portions in the lengthwise direction, at least a portion of the active surface of each of the inductors of the first pair being positioned between the middle portion of the active surface of each inductor of the second pair, and the width of the active surface of the inductors of the first pair being greater than the width of the active surface in the common plane of the second inductors of the second pair.

14. The induction sealing device as claimed in claim 13 wherein the ratio of the width of said active surface of the first pair of inductors to the width of said active surface of the second pair of inductors is in the range between 1 and 4.

15. The induction sealing device as claimed in claim 13 wherein the ratio of the width of said active surface of the first pair of inductors to the width of said active surface of the second pair of inductors is 2.25.

16. The induction sealing device as claimed in claim 13, wherein the width of the active surface of the first pair of inductors is greater than the width of the active surface of the second pair of inductors for at least 80% of the length of the inductors.

17. The induction sealing device as claimed in claim 16 wherein the inductors are rectangular in cross-section.

18. In an induction sealing device for sealing and separating individual packages from a filled tube of pourable product comprising means for advancing the tube in a vertical direction, a pair of jaws moveable toward each other to clamp the tube, severing means for severing the tube while clamped between the jaws, and a heat sealing device comprising: a first pair of inductors and a second pair of inductors, the inductors being mounted in one of the jaws in position to engage the packing material of the tube, the inductors having a length extending in a direction across the width of the tube when compressed by the jaws, and the first pair of inductors being mounted in said jaw in parallel relation to each other and spaced apart from each other, the second pair of inductors being mounted in said jaw in parallel relation to each other and to the first pair of inductors, the first pair of inductors being mounted between and spaced from the inductors of the second pair of inductors, the first pair of inductors being larger in cross-section than the second pair of inductors.

19. The induction sealing device as claimed in claim 18 wherein the first and second pairs of inductors have an action surface, the action surfaces being aligned.

* * * * *